US011233747B2

(12) United States Patent
Herle et al.

(10) Patent No.: US 11,233,747 B2
(45) Date of Patent: Jan. 25, 2022

(54) SYSTEMS AND METHODS FOR ACQUIRING SERVER RESOURCES AT SCHEDULE TIME

(71) Applicant: ServiceNow, Inc., Santa Clara, CA (US)

(72) Inventors: Varsha Herle, Bothell, WA (US); Wenhui Li, Sammamish, WA (US); Sharath Vaddempudi, Bellevue, WA (US); Atul Saini, Bellevue, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/255,660

(22) Filed: Jan. 23, 2019

(65) Prior Publication Data
US 2020/0236059 A1 Jul. 23, 2020

(51) Int. Cl.
*H04L 12/911* (2013.01)
*H04L 29/08* (2006.01)
*H04L 29/06* (2006.01)

(52) U.S. Cl.
CPC ............ *H04L 47/70* (2013.01); *H04L 67/10* (2013.01); *H04L 67/42* (2013.01)

(58) Field of Classification Search
CPC .......... H04L 47/70; H04L 67/10; H04L 67/42
See application file for complete search history.

(56) References Cited

U.S. PATENT DOCUMENTS

| | | | |
|---|---|---|---|
| 6,321,229 B1 | 11/2001 | Goldman | |
| 6,609,122 B1 | 8/2003 | Ensor | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |
| 7,617,073 B2 | 11/2009 | Trinon | |

(Continued)

FOREIGN PATENT DOCUMENTS

WO 2019/011421 A1 1/2019

OTHER PUBLICATIONS

International Search Report and Written Opinion for PCT Application No. PCT/US2020/014289 dated May 8, 2020; 20 pgs.

*Primary Examiner* — Rupal Dharia
*Assistant Examiner* — Steven C Nguyen
(74) *Attorney, Agent, or Firm* — Ffletcher Yoder PC

(57) ABSTRACT

Systems and methods are disclosed that acquire server resources at the time of scheduling an automated instance-related task, such as an instance migration task, and prior to starting the automated task (e.g., prior to determining scheduling conflicts, creating a change request, or creating a move context associated with starting the instance migration task). Advantageously, if acquiring the server resources fails, an orchestration server performing the automated task can simply retry acquiring the server resources, thus avoiding restarting the automated task and re-performing steps of the automated task, thus avoiding unnecessary overhead.

20 Claims, 6 Drawing Sheets

(56) References Cited

U.S. PATENT DOCUMENTS

| | | |
|---|---|---|
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidar |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,635,624 B2 | 1/2014 | Subramanya et al. |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,819,929 B2 | 11/2017 | Moon |
| 9,852,165 B2 | 12/2017 | Morozov |
| 9,959,157 B1 * | 5/2018 | Adogla ................ G06F 11/079 |
| 10,002,203 B2 | 6/2018 | George |
| 2012/0102498 A1 * | 4/2012 | Subramanya ............ G06F 9/46 |
| 2013/0227127 A1 * | 8/2013 | Takano ................ G06F 9/5077 709/224 |
| 2014/0149591 A1 * | 5/2014 | Bhattacharya ...... H04L 67/1097 709/226 |
| 2015/0331715 A1 * | 11/2015 | Sathyanarayana .... G06F 9/4875 |
| 2016/0283270 A1 * | 9/2016 | Amaral ................ G06F 9/5005 |
| 2018/0060117 A1 * | 3/2018 | Maskalik ............ G06F 9/5077 |
| 2018/0225311 A1 * | 8/2018 | Bandopadhyay ... G06F 16/9024 |
| 2018/0241825 A1 * | 8/2018 | Bolton .................... H04L 67/42 |
| 2019/0158606 A1 * | 5/2019 | Guim Bernat .......... H04L 67/34 |
| 2019/0235918 A1 * | 8/2019 | Liu ...................... G06F 11/3442 |
| 2020/0012505 A1 * | 1/2020 | Shil ........................ H04L 67/10 |

\* cited by examiner

SYSTEMS AND METHODS FOR ACQUIRING SERVER RESOURCES AT SCHEDULE TIME

BACKGROUND

The present disclosure relates generally to acquiring server resources, and more particularly, acquiring server resources prior to performing automated instance-related tasks.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

A cloud-based information technology platform may include one or more virtual servers that enable a client instance. An orchestration server of the platform may perform automated instance-related tasks to manage and/or maintain the client instance. For example, a user may request that the orchestration server move or copy the client instance to one or more other servers as part of an automated migration task. To perform an automated instance-related task, the orchestration server may notify the user about the scheduled window for performing the task (e.g., a downtime period for the instance). The automated task may then begin. As part of the automated task, an attempt may be made to acquire server resources (e.g., as a target destination for migrating a client instance). However, the attempt to acquire the server resources may fail due to a variety of reasons, such as a destination server being full, preallocated, or having defective sectors.

Moreover, because the attempt to acquire the server resources occurs at runtime (of the automated task), the orchestration server may not be able to simply retry the acquiring the server resources. Instead, that user may have to resubmit the request to perform the automated task, resulting in performing steps of the automated task again, causing unnecessary overhead.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure includes systems and methods that acquire server resources at the time of scheduling an automated instance-related task, such as an instance migration task, and prior to starting the automated task (e.g., prior to determining scheduling conflicts, creating a change request, or creating a move context associated with starting the instance migration task). Advantageously, if acquiring the server resources fails, a orchestration server performing the automated task retries acquiring the server resources, thus avoiding restarting the automated task and re-performing steps of the automated task, thereby avoiding unnecessary overhead.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
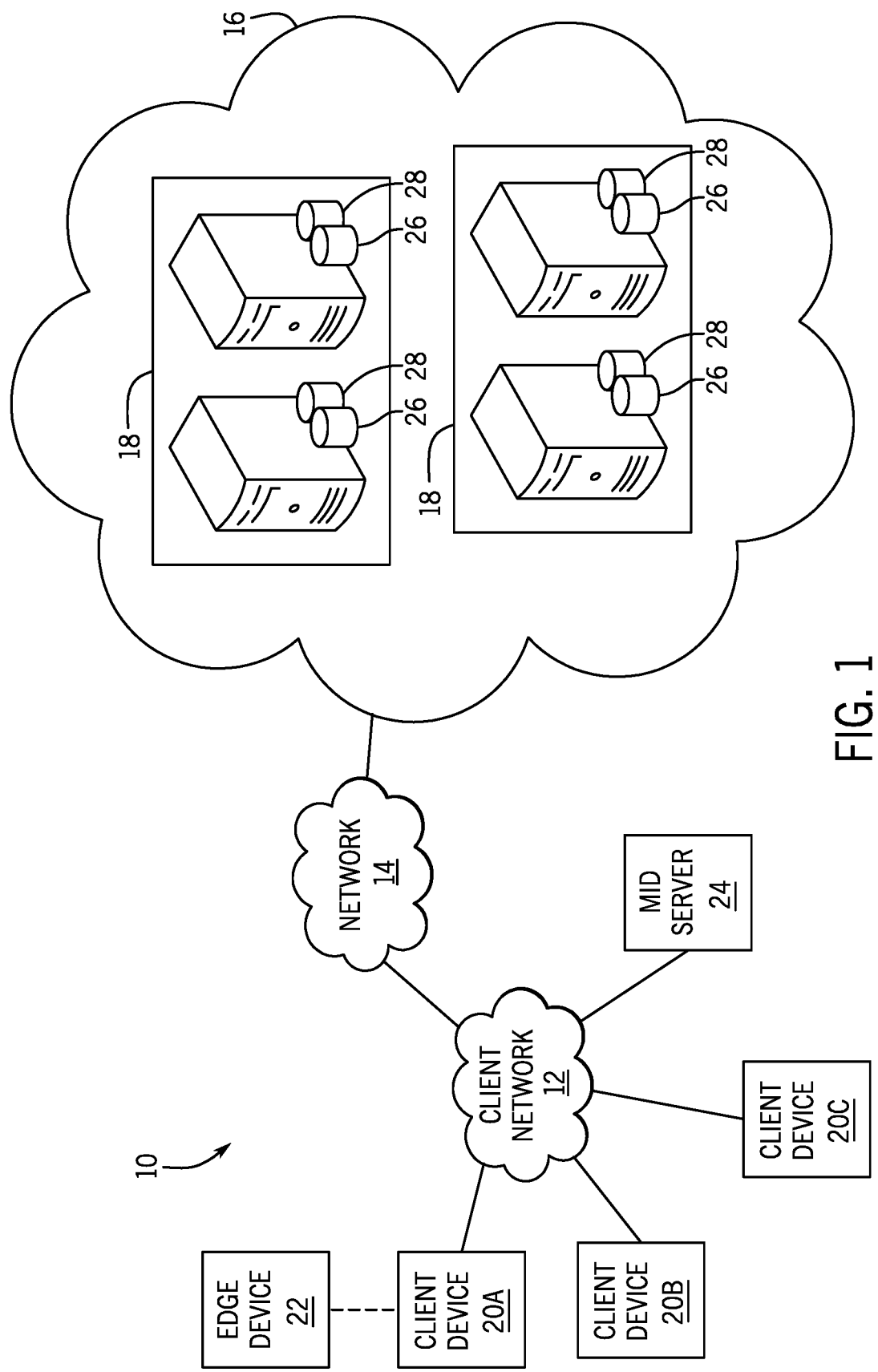
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

A cloud-based information technology platform may include one or more virtual servers that enable a client instance. An orchestration server of the platform may perform automated instance-related tasks to manage and/or maintain the client instance. For example, a user may request that the orchestration server move or copy the client instance to one or more other servers as part of an automated migration task. To perform an automated instance-related task, the orchestration server may notify the user about the scheduled window for performing the task (e.g., a downtime period for the instance), and, prior to starting the task, acquire server resources (e.g., as a destination for the instance in performing the task). The orchestration server may then perform the automated instance-related task, such as an instance migration task. Advantageously, if acquiring the server resources fails, a orchestration server performing the automated task can simply retry acquiring the server resources, thus avoiding restarting the automated task and re-performing steps of the automated task, thus avoiding unnecessary overhead. It should be understood that while the present disclosure discusses the automated instance-related task as an instance migration task, the instance migration task is only used as an example, and the presently disclosed techniques may also be applied to any other suitable automated instance-related task, such as cloning an instance, moving an instance, copying an instance, backing up an instance, or restoring an instance.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform or a workflow orchestrator. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration, managerial, or management device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

The data centers 18 may also include one or more orchestration servers 28 that may orchestrate, manage, and perform one or more automations on the customer instances. These automations may include migrating customer instances, cloning customer instances, moving customer instances, copying customer instances, backing up customer instances, restoring customer instances, or any other suitable automated operation.

Figure 2:
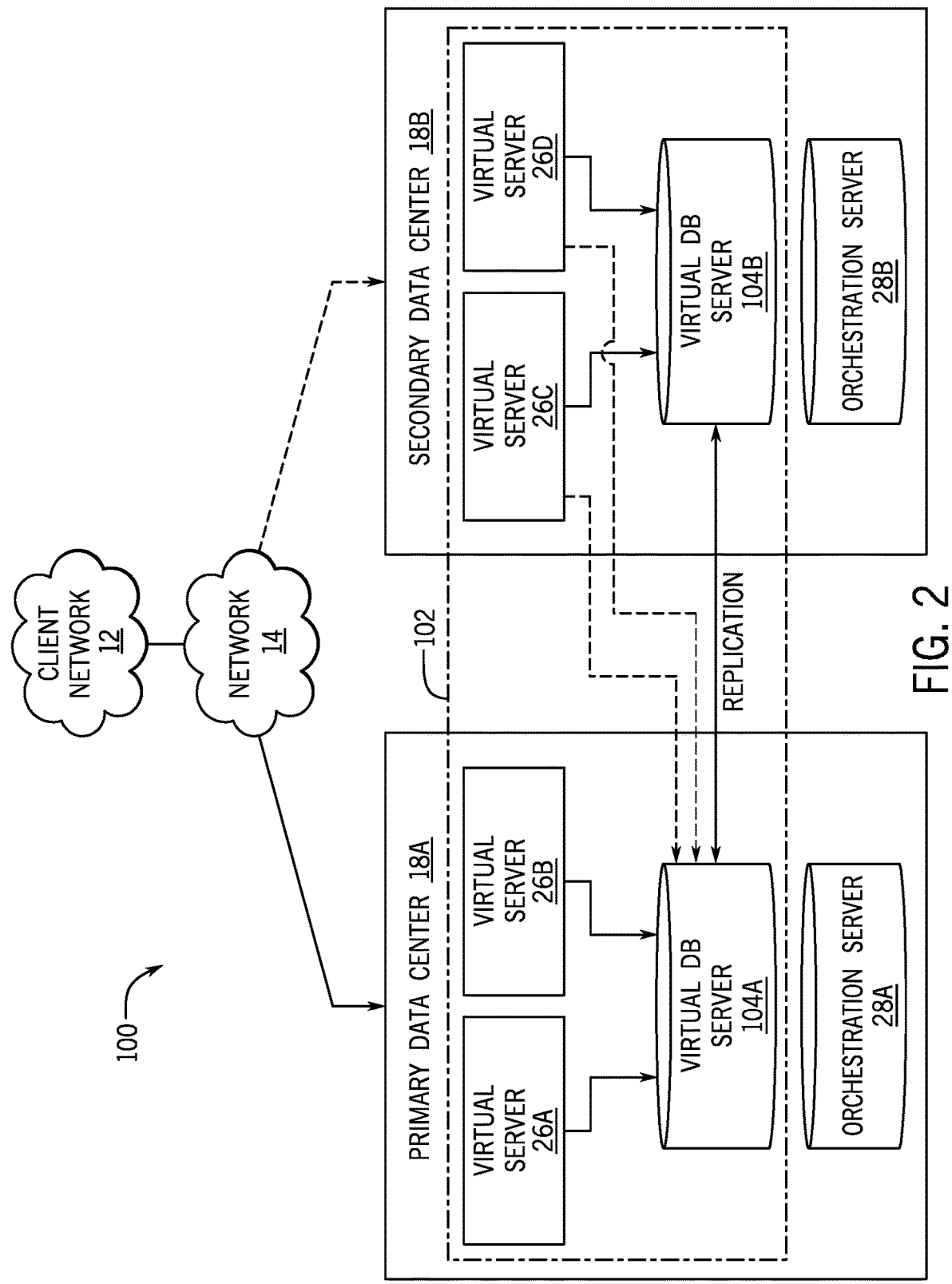
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2). The data centers 18A and 18B also include orchestration servers 28A and 28B that may orchestrate, manage, and perform automation tasks on the client instance 102.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
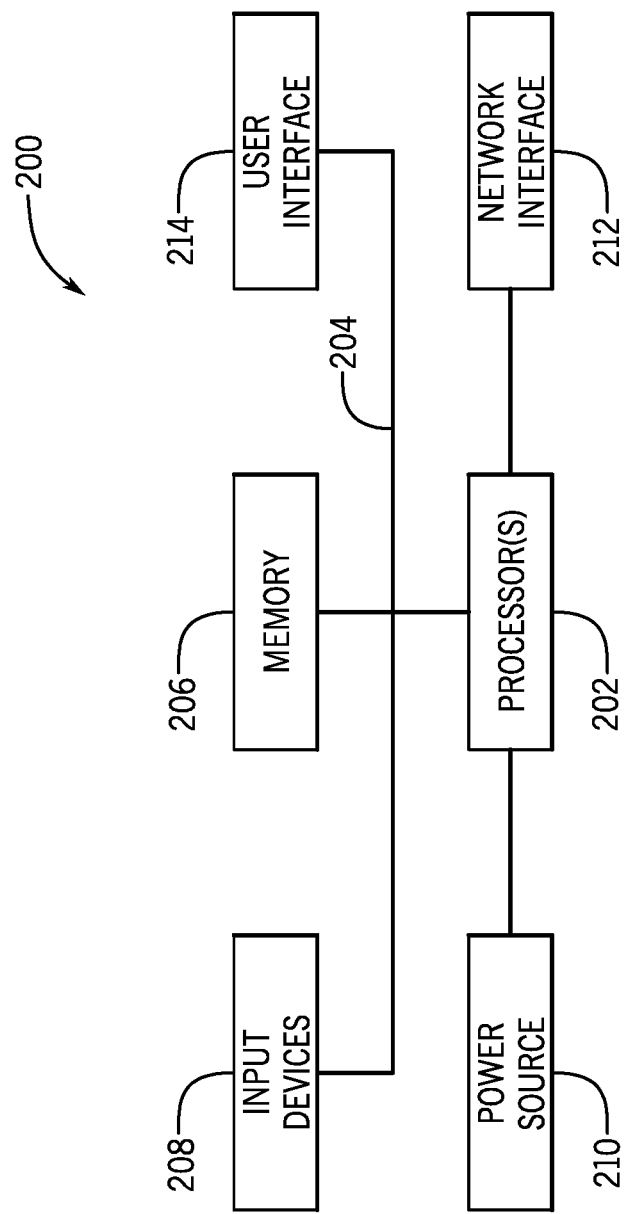
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

The orchestration server 28 of the cloud computing system 10 may perform automated instance-related tasks to manage and/or maintain the client instance 102. For example, a user may request that the orchestration server 28 move or copy the client instance 102 to one or more other servers (e.g., virtual servers 26 and/or virtual database servers 104) and/or one or more other data centers 18 as part of an automated migration task. To perform an automated instance-related task, the orchestration server 28 may notify the user about the scheduled window for performing the task (e.g., a downtime period for the instance 102), and, prior to starting the task, acquire server resources (e.g., as a destination for the instance 102 in performing the task). The server resources may include server capacity, computing memory, storage, and/or processing power. The orchestration server 28 may then perform the automated instance-related task, such as an instance migration task. Advantageously, if acquiring the server resources fails, an orchestration server 28 performing the automated task can simply retry acquiring the server resources, thus avoiding restarting the automated task and re-performing steps of the automated task, thus avoiding unnecessary overhead. While the present disclosure discusses the orchestration server 28 performing automated instance-related tasks, it should be understood that the presently disclosed techniques may also be applied to any suitable system or device capable of performing automated instance-related tasks, such as a management, instrumentation, and discovery (MID) server 24.

Figure 4:
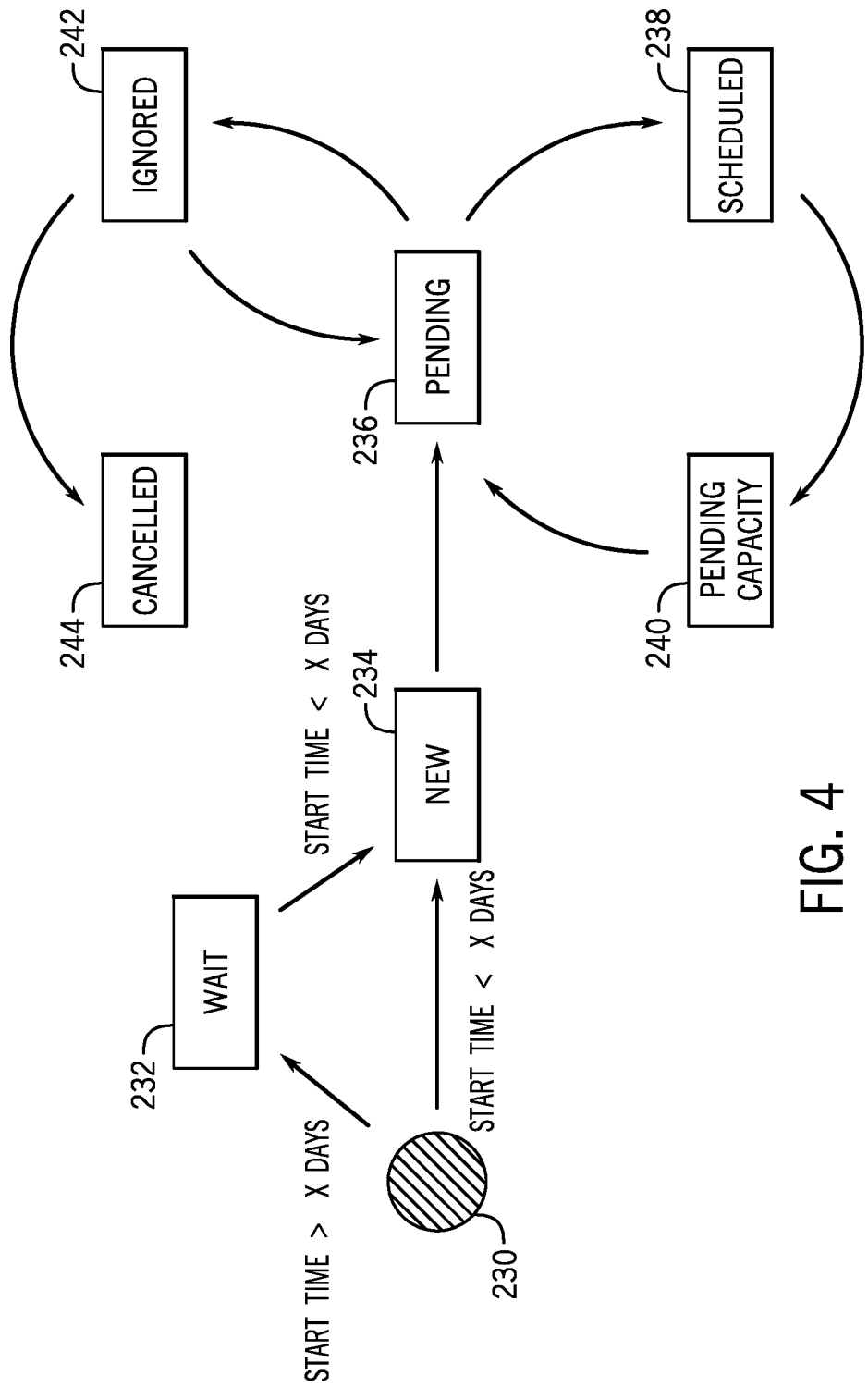
FIG. 4 is a state diagram for acquiring server resources at schedule time, according to embodiments of the present disclosure.

With this in mind, FIG. 4 is a state diagram for acquiring server resources at schedule time, according to embodiments of the present disclosure. In a start state 230, the orchestration server 28 may receive a request to perform an automated instance-related task, such as an instance migration task. The request may include a date and time (e.g., a start time) that the task be performed. If the start time is not within a threshold duration ("X days"), then the task may enter a "Wait" state 232. The threshold duration may be any duration of time that is suitable for the task to be performed, such as between one hour and one month, including 12 hours, one day, two days, three days, five days, one week, ten days, two weeks, and so on.

Once the start time is within the threshold duration, the task may enter a "New" state 234. In the New state 234, the orchestration server 28 may enter the task into a queue, where the task may wait with other tasks to be performed. Additionally, a business rule may be triggered that changes the New state 234 to a "Pending" state 236. The business rule may be a server-side script that executes based on a certain conditions occurring.

In the Pending state 236, the orchestration server 28 may attempt to acquire server resources (e.g., as a destination for the instance 102 in performing the task). If the server resources are acquired successfully, the task may move to a "Scheduled" state 238. In the Scheduled state 238, the task is scheduled. For example, the orchestration server 28 may create a change request that facilitates performing the task by enabling addition, modification, or removal of one or more entities of the cloud computing system 10, such as virtual servers 26, virtual database servers 104, and data centers 18. In particular, the change request may be associated with modifying the destination server resources to allow for migrating the client instance 102 to the destination server resources. Where the task is associated with migrating or moving the client instance 102, the orchestration server 28 may also create a move context that facilitates the move by providing details of the move, such as a move time, size of the client instance 102, move destination, and so on. In particular, a time window may be scheduled (e.g., by the user) or locked for when to perform the task.

In some cases, the server resources acquired in the Scheduled state 238 may be needed by another task (such as another automated migration task). If the other task has a higher priority than the current task (e.g., it is scheduled to be performed earlier than the current task or it is flagged as a higher priority task), then the client server 102 may release the server resources acquired in the Scheduled state 238 to be used by the other, higher priority task. As a result, the current task moves to the "Pending Capacity" state 240.

If the task is in the Pending Capacity state 240, then the orchestration server 28 may attempt to reacquire the server resources by moving back to the Pending state 236.

In some embodiments, if the orchestration server 28 fails to reacquire the server resources (e.g., in a second attempt), the task may move to an "Ignored" state 242. From the Ignored state 242, the orchestration server 28 may attempt to reacquire the server resources (e.g., for a third time) by moving the task to the Pending state 236. If the server resources are still not able to be reacquired, then the task may be cancelled by entering a "Cancelled" state 244. To enter the Cancelled state 244, the orchestration server 28 may cancel or release resources that were reserved for the task. For example, the orchestration server 28 may release the time window that was scheduled or locked in the Scheduled state 238.

Figure 5:
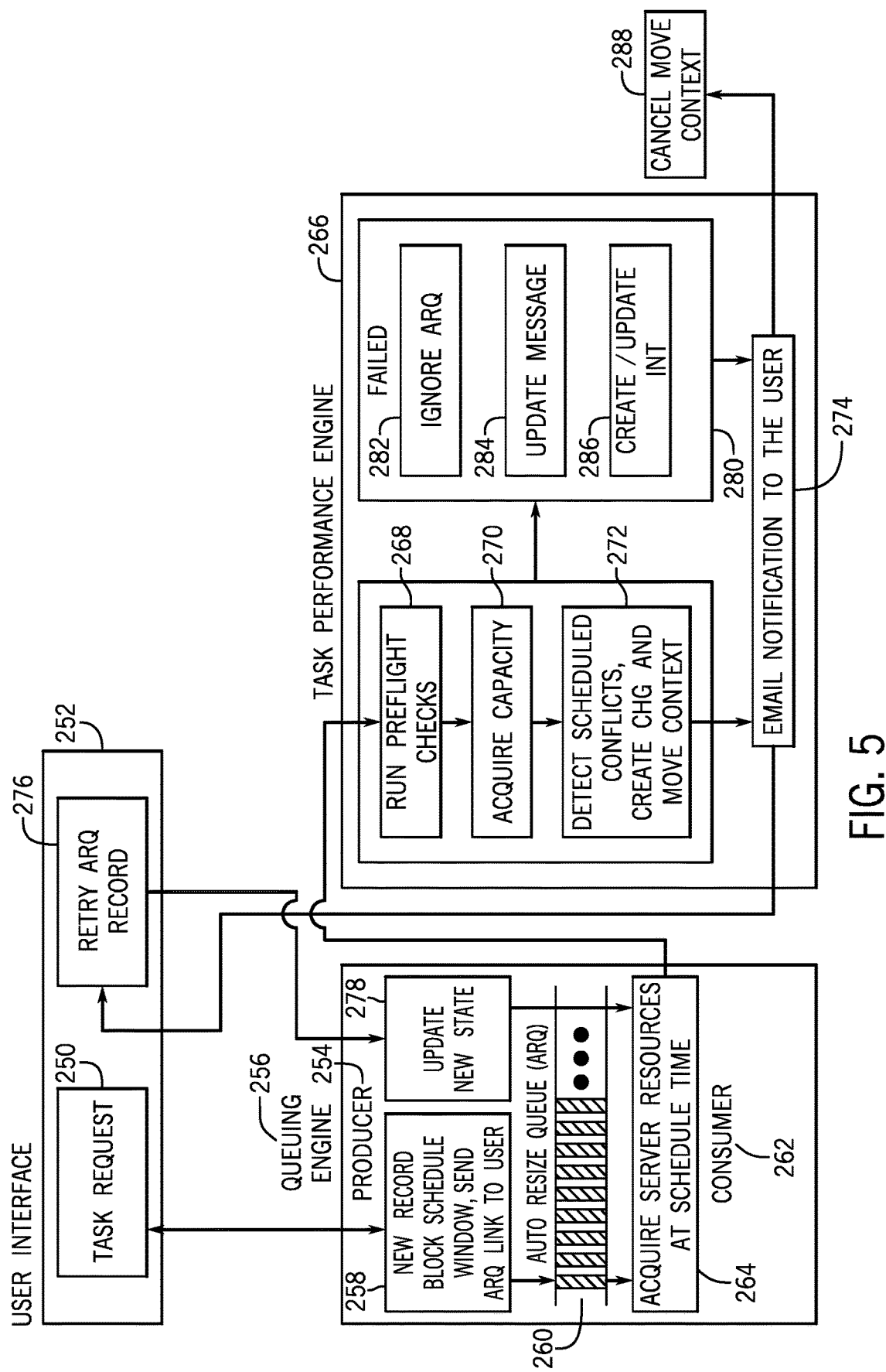
FIG. 5 is a flow diagram for acquiring server resources at schedule time, according to embodiments of the present disclosure.

FIG. 5 is a flow diagram for acquiring server resources at schedule time, according to embodiments of the present disclosure. The orchestration server 28 may receive a request to perform an automated instance-related task, such as an automated migration task. For example, a user may submit the task request 250 via a user interface 252 of an automated task scheduling and performance software application executing on the orchestration server 28. In some embodiments, the automated task scheduling and performance software application may be stored as instructions in the memory 206 and executed by the one or more processors 202.

A producer class 254 of a queuing engine 256 may receive the task request 250, and generate a new task record (having the New state 234), block a scheduled window to perform the task, generate a queue entry associated with the task in a queue (e.g., an auto resize queue (ARQ) 260), and send an ARQ link to the user associated with the queue entry, in block 258. As such, an ARQ table listing queue entries in the ARQ 260 may list the task having a state of New 234. Once the task has the state of New 234, a business rule may be triggered by a consumer class 262 of the queuing engine 256 to acquire server resources at schedule time as shown in block 264.

A task performance engine 266 may then acquire the server resources at schedule time. In particular, the task performance engine 266 may change the state of the task to the Pending state 236. That is, the ARQ table listing queue entries in the ARQ 260 may list the task having a state of Pending 236. In the Pending state 236, the task performance engine 266 may run preflight checks or determine preflight conditions 268 to confirm that the topology (or other parameters) of the client instance 102 is as expected, that the topology (or other parameters) of the destination server resources is as expected, or the like. The task performance engine 266 may then acquire the server resources 270. That is, the task performance engine 266 may hold or reserve the destination server resources and prevent or block other tasks from accessing the destination server resources during or before performance of the task.

The task performance engine 266 may also detect any scheduling conflicts, create a change request (e.g., a CHG ticket), and/or create a move context 272. In particular, the task performance engine 266 may determine whether the scheduled window conflicts with the performance of any other scheduled tasks (such as other scheduled uses of the destination server resources). In some embodiments, the task performance engine 266 may release the hold or reservation of the destination server resources in order to determine any scheduling conflicts. This may be because the task performance engine 266 may not be able to determine scheduling conflicts unless the hold or reservation of the destination server resources is released.

The change request may facilitate performing the task by enabling addition, modification, or removal of one or more entities of the cloud computing system 10, such as virtual servers 26, virtual database servers 104, and data centers 18. Where the task is associated with migrating or moving the client instance 102, the orchestration server 28 may also create a move context that facilitates the move by providing details of the move, such as a move time, size of the client instance 102, move destination, and so on. The task performance engine 266 may enter the move context (as wells details of the move) into a move context table that stores and facilitates management of move contexts. In doing so, the task performance engine 266 may change the state of the task to the Scheduled state 238. That is, the ARQ table listing queue entries in the ARQ 260 may list the task having a state of Scheduled 238. The task performance engine 266 may then notify the user 274 that the task has been completed. For example, the task performance engine 266 may send an email to the user that the client instance 102 has been migrated to the destination server resources.

In the case where one of these steps performed by the task performance engine 266 fails (e.g., the preflight checks 268 are not successful, the server resources are not acquired 270, there are scheduling conflicts, a change request could not be created, and/or a move context could not be created 272), then the task performance engine 266 may retry that step 276. For example, the task performance engine 266 may notify the user 274 that the task and/or the step has failed. The user interface 252 may then display a prompt that enables the user to retry the task. In some cases, the user interface 252 may identify the task based on the associated ARQ entry or record. If the user indicates that the task should be retried, then the queuing engine 256 may update the state of the task as New 234. This may trigger the business rule of the consumer class 262 to acquire the server resources at schedule time as shown in block 264. The task performance engine 266 may then retry the failed step, as well as perform any following steps that were not previously performed. Moreover, the task performance engine 266 may skip performing steps that have already been performed, which may avoid unnecessary overhead. That is, if the server resources were not able to be acquired at block 270, and the user indicated that the task should be retried at block 276, then when the task performance engine 266 retries acquiring the server resources 270, it may skip running preflight checks 268 as they have already been checked during a first attempt. During the retry 276, the orchestration server 28 may update the state of the task to the appropriate state (such as Pending Capacity 240 or Ignored 242).

In the case where the user does not indicate that the task should be retried 276, or in any other case that the task should be cancelled, the task performance engine 280 may perform failure steps 280, including ignoring the task (as identified by the associated ARQ entry or record) 282 by, for example, updating the state of the task to Ignored 242, updating a message associated with the task (e.g., to be sent to the user) 284, and/or a creating/updating incident report ("INT") 286. The task performance engine 280 may then notify the user 274 that the task and/or the step has failed, or should otherwise be cancelled. The task performance engine 280 may update the status of the task to Cancelled 244 and/or remove the move context associated with the task from the move context table 288.

Figure 6:
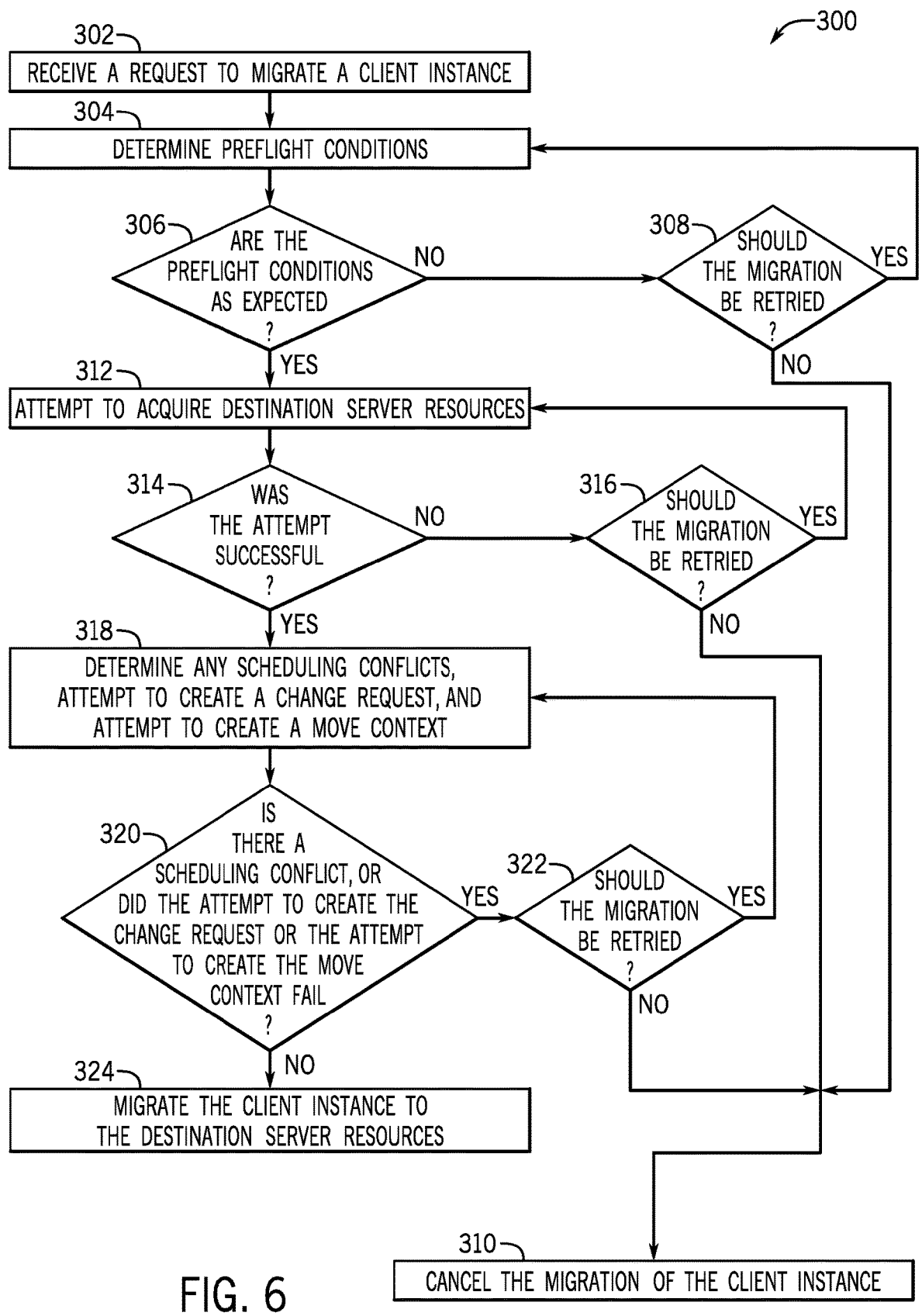
FIG. 6 is a flowchart of a process for acquiring server resources at schedule time, according to embodiments of the present disclosure.

FIG. 6 is a flowchart of a process 300 for acquiring server resources at schedule time, according to embodiments of the present disclosure. The process 300 may be implemented in the form of a software application (e.g., an automated task scheduling and performance software application) that includes instructions executable by at least one suitable processor of the cloud computing system 10, such as a processor of the orchestration server 28. In some embodiments, the orchestration server 28 may be implemented as the computing system 200 of FIG. 3, and, as such, the process 300 may be implemented by the processor 202. The illustrated process 300 is merely provided as an example, and in other embodiments, certain illustrated steps of the process 300 may be performed in other orders, skipped, or repeated, in accordance with the present disclosure.

As illustrated, in process block 302, the processor 202 receives a request to migrate a client instance 102. For example, a user may submit a migration task request 250 via a user interface 252 as illustrated in FIG. 5. The request may include a scheduled window associated with when (e.g., a date and time range) to migrate the client instance 102.

In process block 304, the processor 202 determines preflight conditions. In particular, the processor 202 may determine the topology (or other parameters) of the client instance 102 to be migrated and/or the topology (or other parameters) of the destination server resources. For example, the processor 202 may determine the arrangement of the network associated with the client instance 102 and/or the network associated with the destination server resources, including the geometric layout, configuration, and/or design of workstations or nodes of the networks.

In decision block 306, the processor 202 determines whether the preflight conditions are as expected. In particular, the processor 202 may determine whether the topology of the client instance 102 to be migrated is as expected, that the topology of the destination server resources is as expected, or the like.

If not, the processor 202 may stop the migration of the client instance 102, and, in decision block 308, determine whether the migration should be retried. For example, the processor 202 may prompt the user via the user interface 252 whether migration should be retried. If migration of the client instance 102 should be retried, then the processor 202 may return to process block 304 to redetermine preflight conditions. If migration should not be retried (e.g., the user indicates that migration of the client instance 102 is no longer desired), then, in process block 310, the processor 202 may cancel the migration of the client instance 102.

If the processor 202 determines that the preflight conditions are as expected (from decision block 306), then, in process block 312, the processor 202 attempts to acquire the destination server resources. That is, the processor 202 may attempt to hold or reserve the destination server resources and prevent or block other tasks from accessing the destination server resources during or before migration of the client instance 102.

In decision block 314, the processor 202 determines whether the attempt to acquire the destination server resources is successful. If not, in decision block 316, the processor 202 determines whether the migration should be retried. For example, the processor 202 may prompt the user via the user interface 252 whether migration should be retried. If migration of the client instance 102 should be retried, then the processor 202 may return to process block 312 to attempt to reacquire the destination server resources. If migration should not be retried (e.g., the user indicates that migration of the client instance 102 is no longer desired), then, in process block 310, the processor 202 may cancel the migration of the client instance 102.

If the processor 202 determines that the attempt to acquire the destination server resources is successful (from decision block 314), then, in process block 318, the processor 202 determines any scheduling conflicts, attempts to create a change request, and attempts to create a move context. That is, the processor 202 may determine whether a scheduled window for migrating the client instance 102 conflicts with the performance of any other scheduled tasks (such as other scheduled uses of the destination server resources). In some embodiments, the processor 202 may release the hold or reservation of the destination server resources in order to determine any scheduling conflicts. This may be because the processor 202 may not be able to determine scheduling conflicts unless the hold or reservation of the destination server resources is released. The change request may facilitate migrating the client instance 102 by enabling addition, modification, or removal of one or more entities of the cloud computing system 10, such as virtual servers 26, virtual database servers 104, and data centers 18. The processor 202 may also create a move context that facilitates the move by providing details of the move, such as a move time, size of the client instance 102, move destination, and so on.

In decision block 320, the processor 202 determines whether there are any scheduling conflicts, whether the attempt to create the change request failed, or whether the attempt to create the move context failed. If there was a scheduling conflict, the attempt to create the change request failed, or the attempt to create the move context failed, then, in decision block 322, the processor 202 determines whether the migration should be retried. In some embodiments, if the processor 202 determines there was a scheduling conflict, the processor 202 may first prompt the user via the user interface 252 to select another (e.g., an alternative) scheduled window for migrating the client instance 102, and then prompt the user via the user interface 252 whether migration should be retried. If migration of the client instance 102 should be retried, then the processor 202 may return to process block 318 to determine any scheduling conflicts (e.g., based on the alternative scheduled window), attempt to create a change request, and attempt to create a move context. If migration should not be retried (e.g., the user indicates that migration of the client instance 102 is no longer desired), then, in process block 310, the processor 202 may cancel the migration of the client instance 102.

If the processor 202 determines that there are no scheduling conflicts, the attempt to create the change request is successful, and the attempt to create the move context is successful, then, in process block 324, then the processor 202 migrates the client instance 102 to the destination server resources. In particular, the orchestration server 28 may implement the change request and the move context to move the client instance 102 to the destination server resources.

In this manner, the process 300 may acquiring server resources at schedule time, rather than runtime. As such, on failure of certain steps (e.g., acquiring destination server resources in process block 312 or determining scheduling conflicts, creating change requests and creating move contexts in process block 318), the certain steps may be retried without performing already performed steps (e.g., determining preflight conditions in process block 304 or acquiring destination server resources in process block 312), thus avoiding unnecessary overhead.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A cloud computing system comprising:
one or more data centers;
a client instance hosted by a first set of allocated resources of the one or more data centers, wherein the client instance is accessible by one or more remote client networks; and
an orchestration server communicatively coupled to the one or more data centers via the one or more client networks, wherein the orchestration server is configured to migrate the client instance to a second set of allocated resources of the one or more data centers by:
reserving the second set of allocated resources of the one or more data centers to prevent or block other tasks from accessing the second set of allocated resources during the migration;
prior to migrating the client instance to the second set of allocated resources, releasing the reserved second set of allocated resources to identify any scheduling conflicts associated with migrating the client instance to the second set of allocated resources of the one or more data centers by determining whether a scheduled window for migrating the client instance conflicts with performance of another scheduled task; and
migrating the client instance to the second set of allocated resources of the one or more data centers in response to determining that the second set of allocated resources of the one or more data centers are reserved and that no scheduling conflict is identified.

2. The cloud computing system of claim 1, wherein the first set of allocated resources of the one or more data centers comprises a first set of server resources.

3. The cloud computing system of claim 2, wherein the second set of allocated resources of the one or more data centers comprises a second set of server resources different from the first set of server resources.

4. The cloud computing system of claim 1, wherein the orchestration server is configured to migrate the client instance to the second set of allocated resources of the one or more data centers in response to confirmation that a topology of the second set of allocated resources of the one or more data centers corresponds to a topology of the client instance.

5. The cloud computing system of claim 1, wherein a topology of one or both of the client instance or the second set of allocated resources comprises an architecture of a network associated with the client instance or the second set of allocated resources.

6. The cloud computing system of claim 1, wherein identifying any scheduling conflicts comprises releasing the reserved second set of allocated resources of the one or more data centers prior to identifying any scheduling conflicts.

7. A tangible, non-transitory, machine-readable-medium, comprising machine-readable instructions that, when executed by a processor, cause the processor to perform acts comprising:
reserving server resources to prevent or block other tasks from accessing the server resources during a scheduled window for migrating a client instance of a cloud computing system to the server resources;
prior to migrating the client instance to the server resources, releasing the reserved server resources to determine any scheduling conflicts associated with migrating the client instance of the cloud computing system to the server resources in response to determining that the server resources are reserved; and
migrating the client instance to the server resources in response to determining that there are no scheduling conflicts or determining that the server resources are reserved.

8. The tangible, non-transitory, machine-readable-medium of claim 7, wherein the machine-readable instructions cause the processor to perform acts comprising re-reserving the server resources without determining a topology of the server resources in response to determining that the server resources were not reserved.

9. The tangible, non-transitory, machine-readable-medium of claim 7, wherein migrating the client instance to the server resources comprises:
attempting to create a change request associated with enabling modification of the server resources; and
attempting to create a move context associated with migrating the client instance.

10. The tangible, non-transitory, machine-readable-medium of claim 9, wherein migrating the client instance to the server resources comprises implementing the change request and the move context to move the client instance to the server resources in response to determining that the attempt to create the change request is successful and the attempt to create the move context is successful.

11. A method for acquiring server resources at schedule time, comprising:
receiving a request to migrate a client instance hosted by a first set of server resources of a cloud computing system to a second set of server resources of the cloud computing system;
reserving the second set of server resources to prevent or block other tasks from accessing the second set of server resources during the migration;
prior to migrating the client instance to the second set of server resources, releasing the reserved set of server resources to identify any scheduling conflicts associated with migrating the client instance to the second set of server resources by determining whether a scheduled window for migrating the client instance conflicts with performance of another scheduled task; and
migrating the client instance to the second set of server resources in response to determining that the second set of server resources are reserved and no scheduling conflict is identified.

12. The method of claim 11, wherein the request to migrate the client instance comprises the scheduled window associated with when to migrate the client instance.

13. The method of claim 12, comprising, in response to determining that there is a scheduling conflict associated with migrating the client instance to the second set of server resources, enabling selection of an alternative scheduled window associated with when to migrate the client instance.

14. The method of claim 13, comprising, redetermining any scheduling conflicts associated with migrating the client instance to the second set of server resources based on the alternative scheduled window without confirming that topologies of the client instance and the second set of server resources correspond or re-reserving the second set of server resources.

15. The method of claim 14, wherein redetermining any scheduling conflicts comprises displaying a prompt that enables a user to retry migrating the client instance to the second set of server resources.

16. The method of claim 11, comprising:
attempting to create a change request associated with enabling modification of the second set of server resources; and
in response to determining that the change request was not created, reattempting to create the change request without confirming that topologies of the client instance and the second set of server resources correspond or re-reserving the second set of server resources.

17. The method of claim 16, wherein reattempting to create the change request comprises displaying a prompt that enables a user to retry migrating the client instance to the second set of server resources.

18. The method of claim 11, comprising:
attempting to create a move context associated with migrating the client instance; and
in response to determining that the move context was not created, reattempting to create the move context without confirming that topologies of the client instance and the second set of server resources correspond or re-reserving the second set of server.

19. The method of claim 18, wherein reattempting to create the move context comprises displaying a prompt that enables a user to retry migrating the client instance to the second set of server resources.

20. The method of claim 11, wherein the request comprises a start time and a threshold duration, and wherein the migration is queued as a task to be performed when the start time is within the threshold duration.

* * * * *